United States Patent
Weideman et al.

[11] Patent Number: 5,867,211
[45] Date of Patent: Feb. 2, 1999

[54] APPARATUS AND METHOD FOR REMOVING OFFSET AND SHADING FROM A VIDEO SIGNAL

[75] Inventors: Dean L. Weideman, Lomita; Harold J. Orlando, Costa Mesa, both of Calif.

[73] Assignee: Northrop Grumman Corporation, Los Angeles, Calif.

[21] Appl. No.: 549,592

[22] Filed: Oct. 27, 1995

[51] Int. Cl.⁶ .................................................. H04N 17/00
[52] U.S. Cl. ............................................................ 348/187
[58] Field of Search ...................... 348/181, 182, 348/187, 188; 250/330, 334, 381, 342; 356/51

[56] References Cited

U.S. PATENT DOCUMENTS

| | | |
|---|---|---|
| 4,213,155 | 7/1980 | Miienchow et al. . |
| 4,453,181 | 6/1984 | Munakata et al. . |
| 4,471,451 | 9/1984 | Schenck . |
| 4,491,868 | 1/1985 | Berridge, Jr. et al. . |
| 4,553,260 | 11/1985 | Belt et al. . |
| 4,720,861 | 1/1988 | Chambers . |
| 4,905,296 | 2/1990 | Nishihara . |
| 4,908,644 | 3/1990 | Shindo et al. . |
| 5,033,015 | 7/1991 | Zwirn . |
| 5,221,834 | 6/1993 | Lission et al. ......................... 250/201.9 |
| 5,387,930 | 2/1995 | Toh . |
| 5,621,519 | 4/1997 | Forst et al. ............................ 356/124.5 |
| 5,648,652 | 7/1997 | Sekiya et al. .......................... 250/201.7 |
| 5,654,535 | 8/1997 | Ortyn et al. ............................ 250/201.3 |
| 5,661,816 | 8/1997 | Fantone et al. ............................ 382/100 |

*Primary Examiner*—Nathan Flynn
*Attorney, Agent, or Firm*—Terry J. Anderson; Karl J. Hoch, Jr.

[57] ABSTRACT

An apparatus and method for removing offset and shading from a video signal include a filter that convolves the video signal with a second derivative. The derivative can include first and second non-zero values centered about a third non-zero value, zero-filling between the first and third values, and zero-filling between the second and third values. The filter can be applied to Modulation Transfer Function measurement of an electro-optical sensor, in which offset and shading are removed from the sensor's video signal prior to Fourier analysis. Filtering and Fourier analysis are performed by a digital signal processor, which allows the measurement to be fully automated.

19 Claims, 2 Drawing Sheets

APPARATUS AND METHOD FOR REMOVING OFFSET AND SHADING FROM A VIDEO SIGNAL

FIELD OF THE INVENTION

The invention relates in general to electro-optical sensors and in particular to an apparatus and method for processing a video signal from an electro-optical sensor.

BACKGROUND OF THE INVENTION

An electro-optical sensor is a device that converts radiant energy of a particular wavelength or range of wavelengths into an electrical signal. One example of an electro-optical sensor is a handheld TV camera, which converts images of visible light into an electrical signal that can be stored in electronic memory or displayed on a television screen. Another example of an electro-optical sensor is a Forward Looking Infrared sensor ("FLIR"), which converts images of infrared energy (i.e., heat), invisible to the human eye, into an electrical signal that can be displayed to a viewer. Because the FLIR can "see at night," it is widely used in military navigation and targeting systems and more recently in commercial security systems.

The capability of the electro-optical sensor to resolve the details of an object is referred to as the "resolution" of the sensor. Increasing the resolution allows the sensor to identify small objects at greater distances. High resolution allows the FLIR to identify an enemy target before that target gets too close.

Shading and offset diminish the resolution of the electro-optical sensor and, therefore, must be removed. When the target is small, the sensor's electronics must increase the gain and brightness to a high level in order to see the necessary detail in the target. Although the details of the target become more visible, the background becomes distorted by internal reflections and temperature gradients which result from the increases in gain and brightness. Offset refers to the average level of brightness (temperature) over an entire visible (infrared) sensor, and shading refers to gradients in brightness (temperature) across the sensor. These distortions make it harder to distinguish the target from the background.

Shading and offset cause additional problems when the resolution of the sensor is being measured. A standard measurement for sensor resolution is the Modulation Transfer Function ("MTF"). During MTF measurement, a very small target (e.g., a slit target) is presented to the sensor, and data samples of the sensor's video signal are collected. After all of the samples have been collected, shading and offset are manually removed from the samples and Fourier analysis is performed. This procedure requires an operator to manually derive the offset and shading from trends in data, and then subtract the offset and shading from the data.

Operator intervention during the MTF test is undesirable. The operator must have experience and training to determine trends in the data. Even then, the determinations are subjective and prone to error. Moreover, operator time is required to determine the trends, preventing the test results from being available in real-time.

It is an objective of the present invention to remove shading and offset from a video signal.

It is another objective of the present invention to increase the repeatability and accuracy of an MTF measurement.

It is yet another objective of the present invention to increase the speed and lower the cost of performing an MTF measurement.

SUMMARY OF THE INVENTION

According to one broad aspect of the present invention, apparatus for measuring the resolution of an electro-optical sensor includes a target generator and a signal processor. The signal processor includes a filter that removes shading and offset from a video signal provided by the sensor; and a module that performs a Fourier Transform on the filtered video signal. Because the filter and module are implemented by a signal processor, the resolution measurement can be fully automated. Full automation allows for the resolution measurement to be performed with greater speed, since operator intervention is eliminated. Full automation also increases the accuracy and repeatability of the resolution measurement, since operator error and subjectivity in the resolution measurement are eliminated. Finally, full automation reduces the overall cost of performing the resolution measurement, since an operator does not have to be trained and/or retained.

According to other aspects of the apparatus, a slit target can be generated by the target generator and collimated by collimating optics, the signal processor can be a digital signal processor, the filter can convolve the video signal with a second derivative to remove shading and offset, and the module for analyzing frequency content of the filtered video signal can perform a Discrete Fourier Transform on the filtered video signal.

According to another broad aspect of the present invention, shading and offset can be removed from a video signal using a filter employing a Low Frequency Second Derivative. The Derivative has first and second values centered about a third value, zero-filling between the first and third values, and zero-filling between the second and third values.

DETAILED DESCRIPTION OF THE PREFERRED EMBODIMENTS

Figure 1:
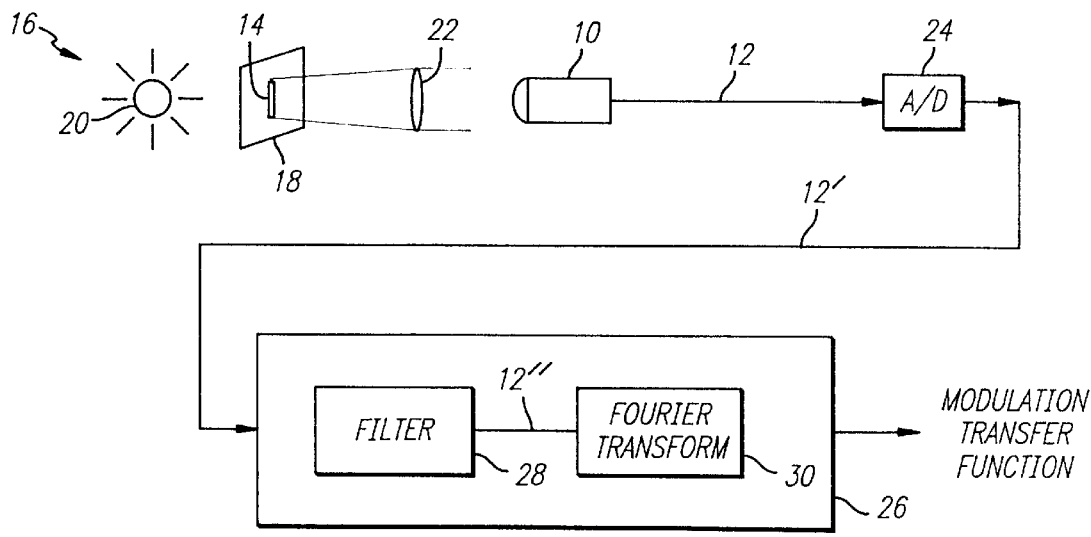
FIG. 1 is a schematic diagram of an electro-optical sensor and apparatus for measuring the resolution of the sensor in accordance with the present invention.

FIG. 1 shows an electro-optical sensor 10 under test. The electro-optical sensor 10 converts light of a particular wavelength or range of wavelengths into a video signal 12. As used herein, light means radiant energy having wavelengths within the electromagnetic spectrum. Thus, light includes, but is not limited to, infrared radiation, visible light, ultraviolet radiation and x-rays. A long wave infrared ("LWIR") sensor, for example, is capable of converting light having wavelengths between 8 and 12 microns into a video signal.

MTF of the sensor 10 is measured by obtaining samples of the sensor's impulse response in one dimension, removing shading and offset from the video signal 12, and calculating the magnitude (modulus) of the Fourier Transform from the filtered video signal. The sensor impulse is obtained by simulating an optical impulse function input signal, such as a slit target 14, to the sensor 10 and directly sampling the video signal 12.

The slit target 14 is generated by a target generator 16, which includes a slit target mask 18 and a source 20 of back irradiation for the mask 18. The slit target mask 18 contains a small rectangular aperture having a width that is proportional to the angular field of view of a single resolution element in the sensor 10. The source 20 can be a nichrome coil for the FLIR or a tungsten lamp and integrating sphere for a TV camera. Target generators 16 in general are well known to those skilled in the art.

The slit target 14 is focused onto the sensor 10 by collimating optics 22. Collimation, which is achieved by placing the slit target mask 18 at the focal plane of the collimating optics 22, allows a smaller slit target 14 to be used at practical distances from the sensor 10. Collimating optics 22 are also well known to those skilled in the art.

The sensor 10 converts a particular frequency component (e.g., LWIR) of the target 14 into the video signal 12. The video signal 12 can be either an analog signal or a digital signal.

If the video signal 12 is an analog signal, it is converted into a digital video signal 12' by an analog-to-digital converter 24. If the video signal is already a digital signal, only a digital interface for the sensor 10 is required.

The MTF is derived from the digital video signal 12' by a digital signal processor 26 which includes a filter 28 for removing shading and offset, and a post-processing module 30 for performing Fourier analysis on the filtered digital signal 12". The filter 28 removes the steady state (dc) and at least first order frequency components from the digital video signal 12'. Shading could be linear, or it could be a higher order function of the internal reflections and temperature gradients within the sensor 10. An exemplary filter 28 is described below in connection with FIGS. 2–5. The post-processing module 30 performs a Discrete Fourier Transform module 30 on the filtered video signal 12" and calculates the magnitude of the transform. The post-processing module 30 could also normalize the resulting real-valued valued sequence to unity by scaling the Transform by the maximum value.

The digital signal processor 26 can be implemented in a personal computer having an Intel 486 microprocessor and appropriate software for performing the filtering and the Discrete Fourier Transform. In the alternative, the digital signal processor 26 can be implemented in a Finite Impulse Response computer, which would filter the video signal 12' and perform the Discrete Fourier Transform.

Figure 2:
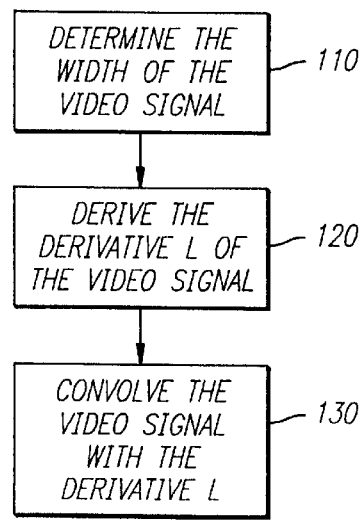
FIG. 2 is a flowchart of steps for removing offset and shading from a video signal generated by the sensor, the steps being performed by a filter which forms a part of the apparatus shown in FIG. 1.
Figure 3:
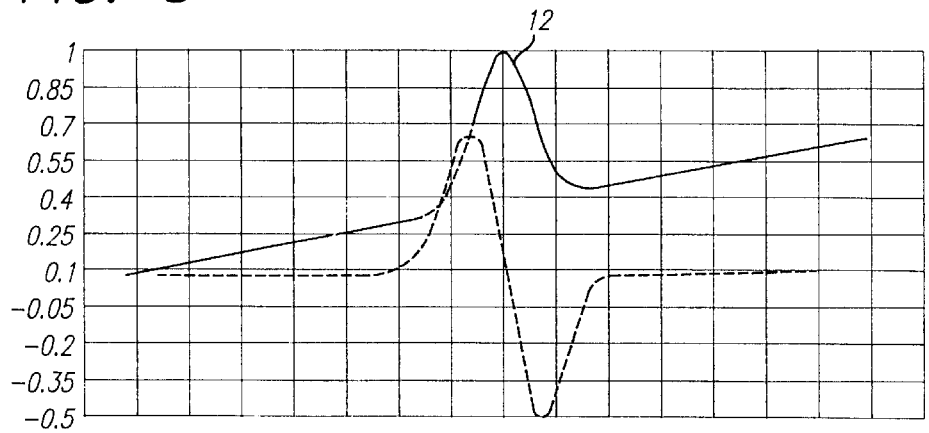
FIG. 3 depicts a waveform for the video signal (in solid lines) and a differential of the waveform (in dashed lines)

FIG. 2 describes the steps 110–130 performed by the filter 28. In step 110, the width of the video signal 12' is determined. The video signal 12' provided by the sensor 10 in response to the slit target 14 is expected to have a waveform somewhere between a Gaussian and Sync waveform. A fast and simple approach for determining the width of the video signal 12 is to find the peak value of the waveform and determine the width at the 50% point. A more elaborate method of determining the width of the video signal 12' is to differentiate the video signal 12' by performing a low pass differential. Assuming that the video signal 12' has a Gaussian waveform (G) of the equation $$G_i = e^{\frac{(i - \frac{N}{2})^2}{\sigma^2} - 1} + \text{OFFSET} + \text{SHADING}$$

where i is the $i^{th}$ sample, N is the sample size, $\sigma$ is the standard deviation, the differential of the waveform (Gdif) can be determined by processing the video signal 12' according to the equation $$Gdif_j = \Sigma \ \text{derivcoeff}_m(G_{j+m} - G_{j-m})$$

where $\text{derivcoeff}_m$ is the $m^{th}$ derivative of Gdif. The width of video signal 12' is defined as the separation between the maxima and minima of the resulting differential. The waveform (in solid lines) and differential thereof (in dashed lines) are shown graphically in FIG. 3.

Figure 4:
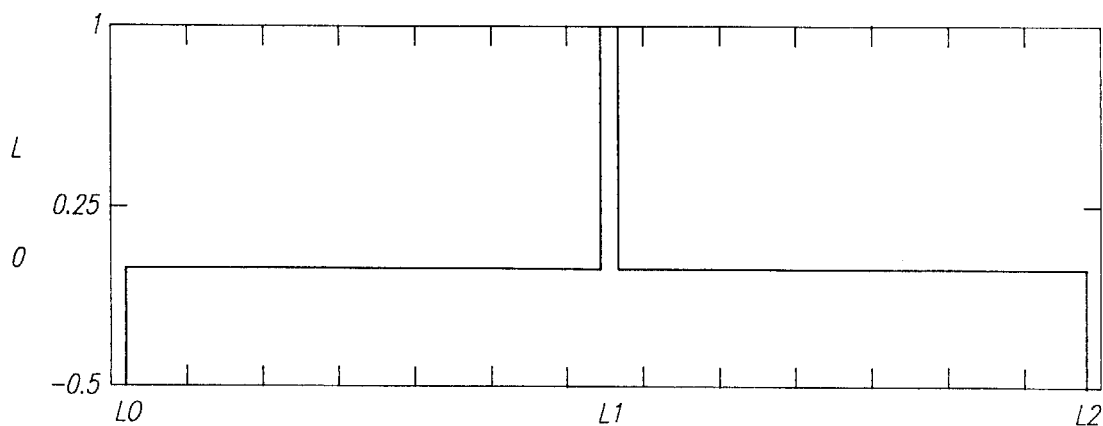
FIG. 4 is a plot of a Low Frequency Second Derivative utilized by the filter.

In step 120, a Low Frequency Second Derivative L is derived from the width of the video signal 12'. The Low Frequency Second Derivative L has three non-zero values L0, L1 and L2, where values L0 and L2 are located symmetrically about value L1. As shown in FIG. 4, values L0 and L2 are equal to −0.5, and value L1 is equal to 1.0. However, L0, L1 and L2 can be of any value, provided that L0+L1+L2=0 and L0=L2. Spacing between the values L0, L1 and L2 is proportional to the width of the region of interest, which is equal to the width of the video signal 12' times an application factor. Although the application factor is determined empirically, a factor of 3.2 has been found to work well in several different LWIR sensors.

The Derivative L has the value of zero between values L0 and L1. Similarly, the Derivative L is zero-filled between the values L1 and L2.

Figure 5:
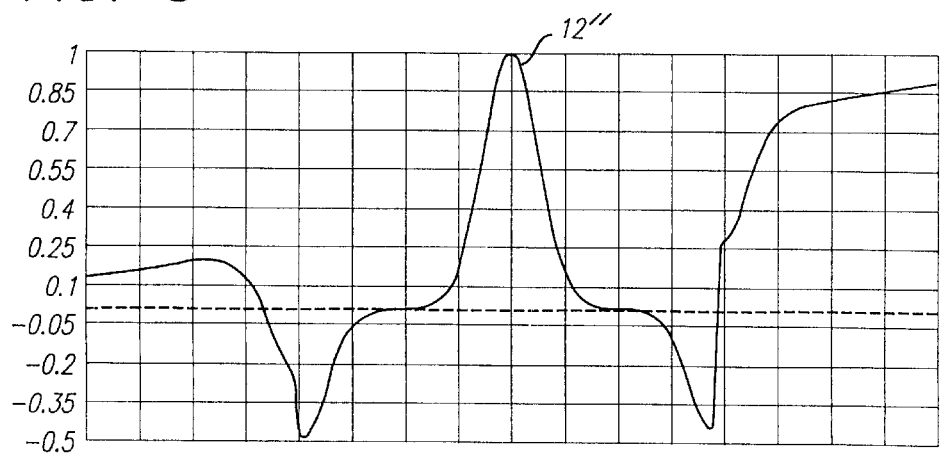
FIG. 5 depicts the video signal after convolution with the Low Frequency Second Derivative.

In step 130, the video signal 12' is convolved with the Derivative L to remove shading and offset. The filtered video signal 12" that results is supplied to the post-processing module 30. The post-processing module 30 utilizes only the region of interest of the video signal 12", which is centered about the positive peak. FIG. 5 shows the filtered video signal 12".

Prior to filtering of the video signal 12' by the digital signal processor 26, noise might have to be removed from the video signal 12' in order to increase its signal-to-noise ratio. The noise could be removed by the digital signal processor 26, which would utilize a well known technique such as frame averaging.

It is understood that various changes and modifications may be made without departing from the spirit and scope of the invention. For example, a bar chart target could be presented to the sensor instead of the slit target (four bars for FLIRS and three bars for TV cameras), with samples of the resulting sinusoidal response being taken across the bars, and MTF being calculated at desired spatial frequencies. Other examples include using an analog signal processor instead of a digital signal processor and analog-to-digital converter; and determining the width of the video signal by multiplying the peak value by a constant.

It is also understood that the filter according to the present invention could be applied to other resolution measurements, such as an Optical Transfer Function.

Finally, it is understood that use of the filter is not limited to resolution measurements, and that the filter can be used in any situation where it is desirable to remove offset and shading from a video signal. For example, it would be desirable to remove offset and shading from a video signal that was displayed directly on a screen, and it would be extremely desirable to remove offset and shading from a video signal prior processing for target acquisition. Accordingly, the present invention is not limited to the precise embodiment described hereinabove.

What is claimed is:

1. Apparatus for measuring the Modulation Transfer Function of an electro-optical sensor, comprising:

a slit target generator;

collimating optics disposed along an optical path between the slit target generator and a radiation-receiving surface of the sensor; and a digital signal processor including a filter for removing offset and shading from a video signal provided by the sensor, and a module for performing a Discrete Fourier Transform on an output of the filter to provide the Modulation Transfer Function.

2. The apparatus of claim 1, wherein the filter includes means for determining the width of the video signal, and means for convolving the video signal and a second derivative.

3. The apparatus of claim 2, wherein the derivative is a Low Frequency Second Derivative.

4. Apparatus for measuring the resolution of an electro-optical sensor, comprising:

a target generator; and a signal processor, responsive to a video signal from the sensor, the signal processor including a filter for removing shading and offset from the video signal, and a post-processing module for performing a Fourier Transform on an output of the filter.

5. The apparatus of claim 4, wherein the target generator generates a slit target during a measurement of the resolution, and wherein the apparatus further includes collimating optics disposed along an optical path between the target generator and the sensor.

6. The apparatus of claim 5, wherein the signal processor is a digital signal processor, and wherein the post-processing module performs a Discrete Fourier Transform on the output of the filter and calculates the magnitude of the Transform, an output of the digital signal processor providing a Modulated Transfer Function.

7. The apparatus according to claim 4, wherein the filter includes means for removing steady state and first order frequency components from the video signal.

8. The apparatus of claim 7, wherein the filter includes means for determining the width of the video signal, and means for convolving the video signal with a second derivative, the second derivative being based on the width of the video signal.

9. The apparatus of claim 8, wherein the second derivative includes first and second values centered about a third value, the first, second and third values being non-zero.

10. The apparatus of claim 9, wherein the second derivative is zero-filled between the first and third value, and wherein the second derivative is zero-filled between the second and third values.

11. The apparatus of claim 8, wherein the means for determining the width of the video signal includes means for performing a differential on the video signal, and means for measuring the difference between maxima and minima of the differential.

12. The apparatus of claim 8, wherein the target generator generates a slit target, and wherein the means for measuring the width includes means for measuring the width of a Gaussian function.

13. A digital signal processor for deriving a Modulation Transfer Function from a video signal provided by an electro-optical sensor, comprising:

a filter for convolving the video signal and a second derivative; and a Discrete Fourier Transform module, responsive to an output of the filter, for deriving the Modulation Transfer Function.

14. The processor of claim 13, wherein the second derivative includes first and second non-zero values centered about a third non-zero valve, zero-filling between the first and third values, and zero-filling between the second and third values.

15. A method of processing a video signal from an electro-optical sensor in real time during measurement of Modulation Transfer Function, comprising the steps of:

using a signal processor to remove offset and shading from the video signal; and using the signal processor to perform a Fourier Transform on the video signal to derive the Modulation Transfer Function.

16. The method of claim 15, wherein the step of removing the offset and shading includes the steps of:

determining the width of the video signal;

generating a second derivative based on the width; and convolving the video signal and the second derivative.

17. The method of claim 16, wherein the step of determining the width of the video signal includes the steps of:

performing a differential on the video signal; and taking a difference between maxima and minima of the differential, the difference being proportional to the width.

18. The method of claim 16, wherein the Fourier Transform is performed over a region of interest of the filtered video signal.

19. The method of claim 16, wherein the second derivative includes first and second non-zero values centered about a third non-zero valve, zero-filling between the first and third values, and zero-filling between the second and third values.

* * * * *